United States Patent [19]

Tsuji et al.

[11] 4,229,763
[45] Oct. 21, 1980

[54] OPTICAL HIGH DENSITY FM RECORDING DEVICE WITH CORRECTIVE SIGNAL

[75] Inventors: Takao Tsuji, Kawasaki; Takeshi Goshima, Tokyo; Hideaki Sato, Yokohama, all of Japan

[73] Assignee: Canon Kabushiki Kaisha, Tokyo, Japan

[21] Appl. No.: 922,645

[22] Filed: Jul. 7, 1978

Related U.S. Application Data

[63] Continuation of Ser. No. 614,184, Sep. 17, 1975, abandoned.

[30] Foreign Application Priority Data

Sep. 20, 1974 [JP] Japan .................................. 49-108567

[51] Int. Cl.$^2$ ................ G11B 11/00; G11B 7/00; H04N 5/76
[52] U.S. Cl. ................... 358/128.5; 179/100.3 V; 179/100.4 C
[58] Field of Search ................... 358/128-132, 358/4, 8; 179/100.3 GN, 100.3 G, 100.3 V, 100.4 C, 100.4 M, 100.41 L, 100.41 P; 346/76 L, 108

[56] References Cited

U.S. PATENT DOCUMENTS

| 1,732,874 | 10/1929 | Zworykin | 179/100.3 G |
| 1,802,699 | 4/1931 | Bloomenthal | 179/100.3 G |
| 1,986,569 | 1/1935 | Frayne | 179/100.3 GN |
| 2,592,572 | 4/1952 | Jennings | 179/100.3 GN |
| 3,534,166 | 10/1970 | Korpel | 179/100.3 G |
| 3,800,099 | 3/1974 | Dickopp | 179/100.4 C |
| 3,800,100 | 3/1974 | Runge | 179/100.4 C |
| 3,829,605 | 8/1974 | Dickopp | 179/100.41 P |

*Primary Examiner*—Raymond F. Cardillo, Jr.
*Attorney, Agent, or Firm*—Fitzpatrick, Cella, Harper & Scinto

[57] ABSTRACT

An optical high density recording device which comprises, in combination, a beam generator, a beam modulator to modulate the beam in accordance with an applied modulating signal, a recording medium to record a locus of the beam irradiated thereonto. The recording medium and the beam irradiated onto the recording medium are moved relatively to one another, a recording signal is introduced onto the recording medium, a corrective voltage to be determined by a function of the recording signal is generated and is applied with the recording signal to the beam modulator as a modulating signal.

7 Claims, 28 Drawing Figures

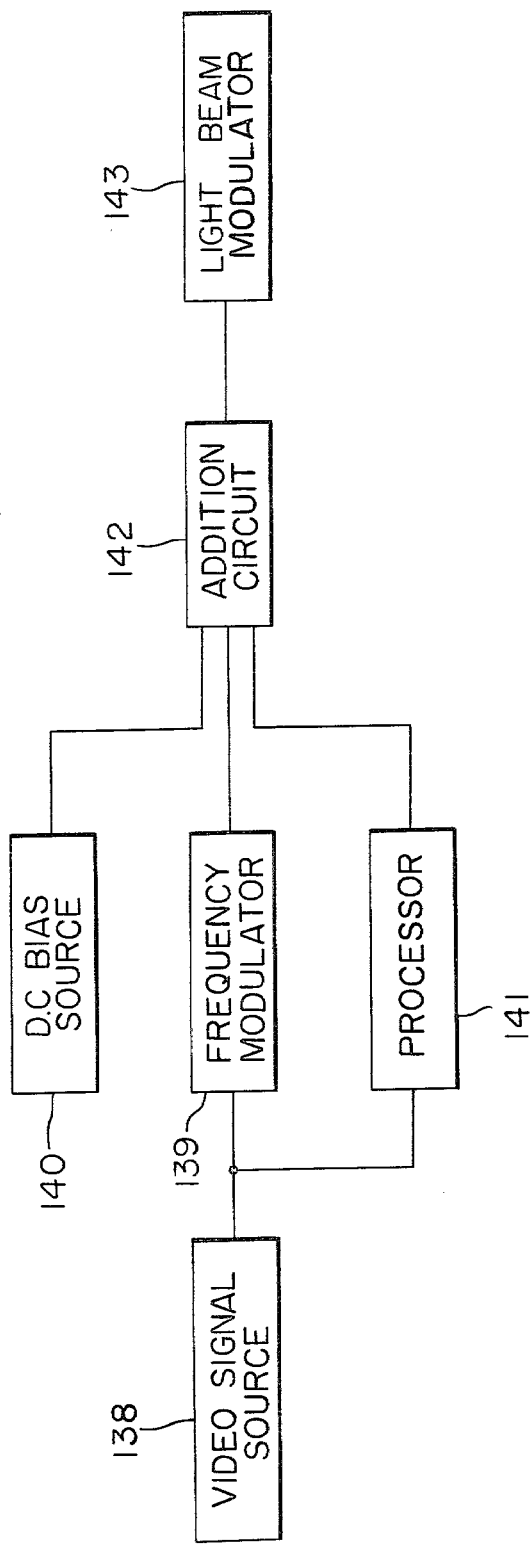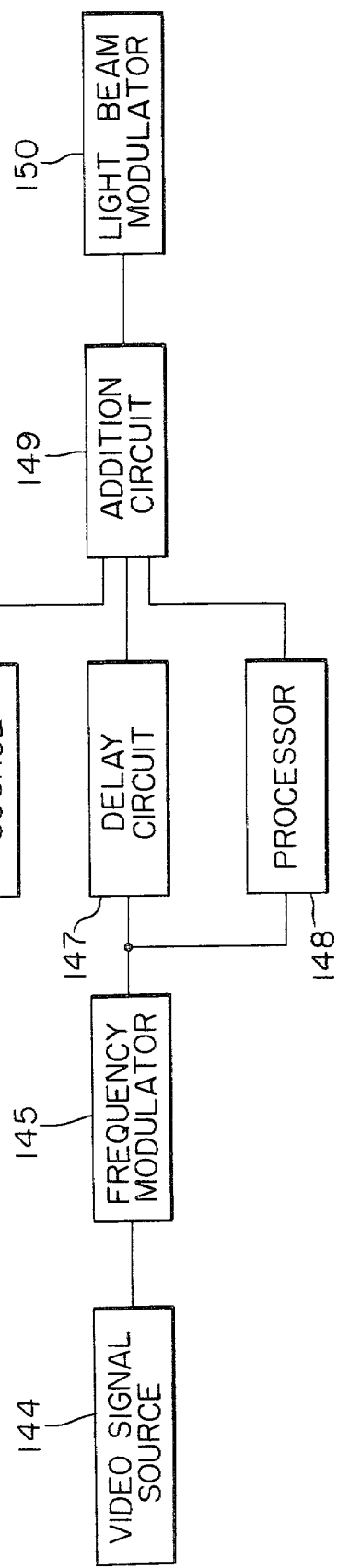

FIG. 17
(a) 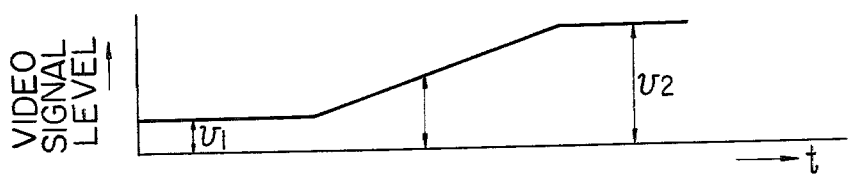
(b) 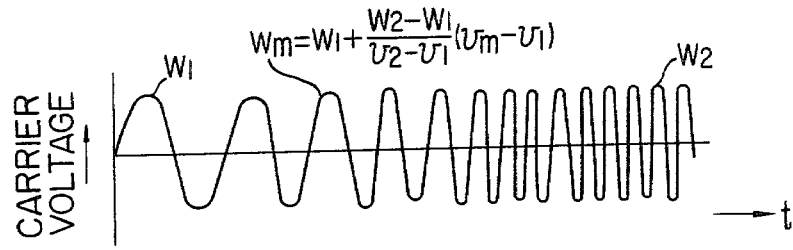
(c) 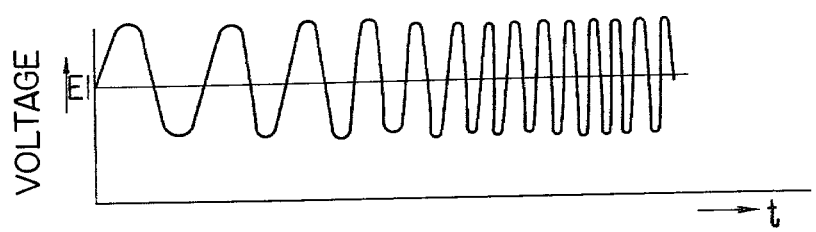
(d) 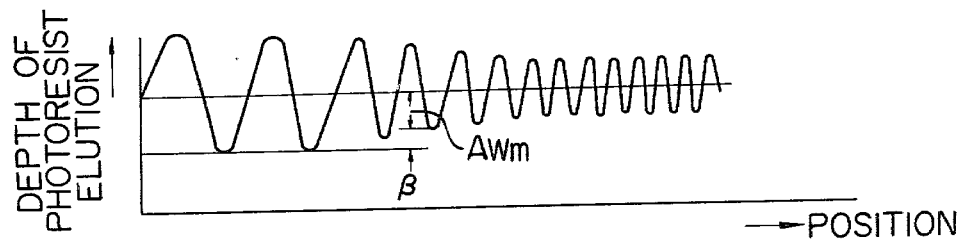
(e) 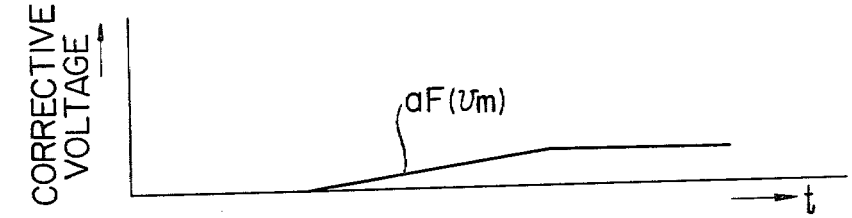
(f) 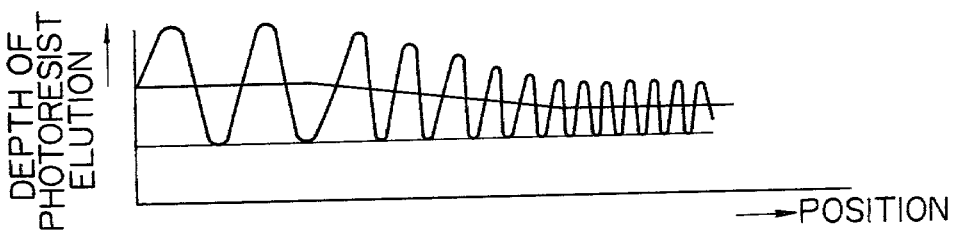

OPTICAL HIGH DENSITY FM RECORDING DEVICE WITH CORRECTIVE SIGNAL

This is a continuation of application Ser. No. 614,184 filed Sept. 17, 1975, now abandoned.

BACKGROUND OF THE INVENTION

1. Field of the Invention

This invention relates to an optical high density recording device capable of recording on a circular disc an image signal in physical shape at high density. More particularly, it is concerned with an optical high density recording device which carries out recording of a beam modulated by an image signal onto a photosensitive disc.

2. Description of Prior Arts

There has already been proposed means for reproducing video-signals, wherein irregular waveforms which have been obtained by frequency-modulation or pulse-frequency-modulation are first recorded on a plastic disc with a spiral locus or path, then a needle or stylus is contacted under appropriate pressure along the recorded groove in the spiral locus having therein irregular surfaces corresponding to the irregular waveforms, while rotating the circular plastic disc, and vibrations which the stylus receives during its running along the irregular surfaces in the spiral groove are converted into an electrical signal by means of, for example, a ceramic piezo-electric element, and finally the electrical signal is demodulated to obtain reproduced video signal.

In general, a band of the video signal for use in the television technique should at least be 3 MHz, and, when such video signal is to be frequency-modulated, approximately 4 to 6 MHz is said to be required as the frequency range of the carrier wave. This frequency is higher than the upper limit of the general voice frequency, i.e., 20 KHz, by 200 to 300 times.

In the general audio-recording, when a master record disc, which is usually called "lacquer disc," is to be cut, the cutting is done at the same speed as the reproduction speed of the record, i.e., in the actual reproducing time. The reason for this is that, at the present level of the technique, a disc cutter can be driven relatively easily, even when the frequency is approximately equal to 20 KHz or twice as high as such voice frequency. However, in the case of the video signal, when the cutting is to be carried out in the actual reproducing time, the disc cutter must be driven in such high frequency as 4 to 6 MHz, in consequence of which, even if the depth of cutting is as shallow as 1 micron or less, it is hardly possible to carry out the cutting operation with the present-day technique.

At present, the only effective means for cutting the disc in the actual reproducing time in conformity to the irregularities on the groove surface of such high frequency as mentioned above is the recording of such high frequency signal onto a thin photoresist layer by means of a laser beam.

However, when the recording of the video signal is to be conducted on a disc coated with a photosensitive material with a light beam such as a laser beam which has been modulated by the video signal to be recorded, there inevitably takes place undesirable results for the reasons to be mentioned later. That is, when the wavelength of the video signal is long, the topmost and bottommost parts of the wavy surfaces in the groove formed by the beam irradiation become high, and, when the wavelength is short, the top and bottom parts of the wavy surfaces in the groove formed by the beam irradiation on the disc becomes low.

On the other hand, as a pickup to detect the undulating irregular surfaces formed in the groove on the disc and to reproduce the detected signal is for detecting intervals between the adjacent peak portions of the undulating irregular surfaces in the groove formed on the disc and reproducing the thus detected video signals, if the height of the peak and valley of the undulating surfaces are varied by frequency of the recorded video signal, the pickup slides over the disc at the portion where the variation in height exists, or the drop-out portion will inevitably be included in the reproduced video signal due to the pickup being depressed with a very large pressure, or, at the worst of the case, the disc is destroyed locally.

SUMMARY OF THE INVENTION

The present invention intends to remove such disadvantages inherent in the known device, according to which it is able to provide an optical high density recording device capable of producing a video disc which can accurately reproduce a recorded signal.

It is another object of the present invention to provide an optical high density recording device which is very simple in its circuit construction, and capable of accurately reproducing recorded signals at the time of reproduction of the video disc.

It is still another object of the present invention to provide an optical high density recording device capable of producing a video disc which can accurately reproduce recorded signals irrespective of the frequency of an image signal as recorded.

It is another object of the present invention to provide an optical high density recording device which is very simple in its circuit construction, and is so constructed as to reproduce accurately the recorded signals at the time of reproduction of the video disc.

The foregoing objects and other objects of the present invention as well as specific construction and functions of the device will become more apparently understood from the following description of preferred embodiments thereof, when read in conjunction with the accompanying drawing.

BRIEF DESCRIPTION OF THE DRAWING

In the drawing:

FIGS. 7A and 7B are for explanation of a pickup for use in the reproduction device shown in FIG. 6, wherein FIG. 7A is a side elevational view of the pickup, and FIG. 7B is an enlarged perspective view thereof;

FIG. 16 is a block diagram for explaining the recording method according to the present invention;

FIGS. 17A to 17F are respectively graphical representations showing signal waveforms and depth of elution of the photoresist layer;

FIG. 18 is a block diagram for explaining another embodiment of the recording method according to the present invention;

DETAILED DESCRIPTION OF PREFERRED EMBODIMENTS (1) Preliminary Discussion of Recording Technique Before going into details of the present invention, recording of a signal on the thin photoresist layer by means of laser beam will be explained so that the present invention may be more clearly and easily understood.

Figure 1:
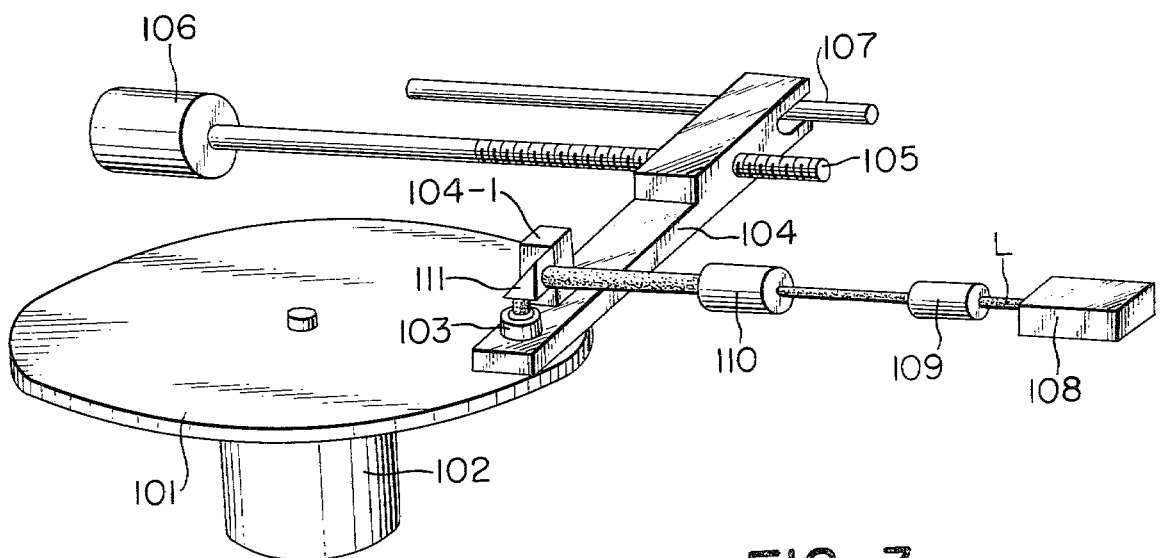
FIG. 1 is a perspective view showing a device for recording an information on a thin photoresist layer by means of laser beam.

Referring to FIG. 1, which shows one example of means for forming an undulating waveforms of a signal on a thin photoresist layer by means of a laser beam, a glass dics 101 coated on its surface with a positive photoresist, i.e., a photo-dissolving type resist material, in a thickness of a few microns is driven by a disc drive motor 102. In contiguity to this disc 101, there is provided a light converging optical system 103 supported by a holder 104. The holder 104 is engaged with, and made movable by an advancing screw rod 105 which is rotated by a motor 106. It is also made possible to cause the light converging optical system 103 to move in the radial direction of the disc 101. A rod 107 provided at one end of the holder 104 serves as a guide to prevent the holder 104 from rotating around the advancing screw rod 105.

Both advancing motor 106 and disc drive motor 102 are driven by a drive circuit (not shown) with a number of revolutions associated with a value of the pitch which the spiral groove on the disc will take in the radial direction thereof as the locus of the signal to be recorded.

Figure 2:
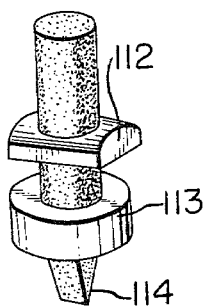
FIG. 2 is a partially enlarged perspective view of the device shown in FIG. 1.
Figure 3:
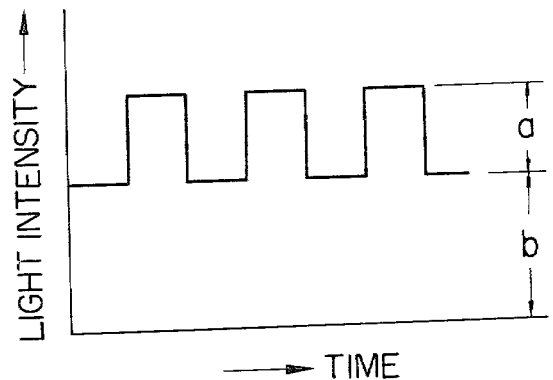
FIG. 3 is a graphical representation for explaining variations in light intensity with lapse of time.

The light converging optical system 103 is so constructed that it may apply a light beam L from a laser oscillator 108 to a light modulator 109 for determining transmission quantity of the light therethrough in accordance with a signal level sent from a modulating signal source (not shown), apply the thus modulated light to an optical system 110 for expanding the diameter of the light beam, and further product the expanded light beam onto a reflecting mirror 111 supported on a protruded member 104-1 of the holder 104 so that it may enter into the light converging optical system 103. The thus projected light into this light converging optical system 103, as shown in FIG. 2, is rendered a linearly distributed light 114 by means of a cylindrical lens 112 and a light converging lens 113. When this linearly distributed light 114, with its longitudinal direction being substantially coincided with the radial direction of the disc 101, is exposed on the photoresist layer coated on the disc 101 with variations in light intensity with lapse of time as shown in FIG. 3, while causing the disc to rotate, the exposed portion of the photoresist layer, when subjected to development, is dissolved, and the remaining unexposed portions are left at the bottom of the spiral groove or track in a U-shaped or gutter-shaped cross-section in the form of undulation in conformity to variations in light intensity with lapse of time. Incidentally, in FIG. 3, the portion a denotes a signal component, and the portion b denotes a bias component to form a guide groove for a pickup at the time of reproduction.

Figure 5:
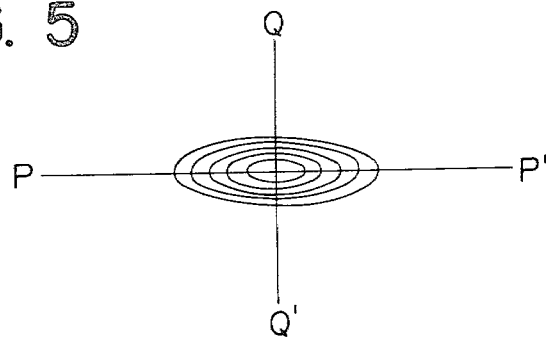
FIG. 5 is an explanatory diagram showing distribution of beam energy on the recording medium.

The reason for the groove to be formed in the photoresist layer 115 assuming the U-shaped or gutter-shaped cross-section is that distribution of the light energy on the photoresist surface of the linearly distributed light 114 shown in FIG. 2 possesses such state of distribution as shown in FIG. 5, and also a light distribution in conical form to be indicated by an equal distribution curve of energy having the maximum value at its center.

Figure 4:
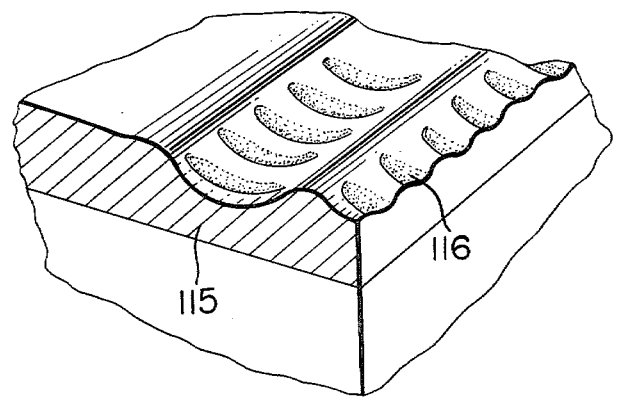
FIG. 4 is a perspective view partly in cross-section showing loci of signals formed on a recording medium.

Describing now very general outline of the relation between FIGS. 3 and 4, and portions shaded in black in FIG. 4 are the exposed portions which correspond to the sum of the components a and b in FIG. 3 where the depth of elution or dissolving-out of the photoresist layer is the deepest, while the portions between the adjacent shaded portions stand for those subjected to the exposure to an extent approximately corresponding to the component b in FIG. 3. A reference numeral 116 in FIG. 4 designates a cross-sectional line of the groove along the center of the recording locus, the wavy irregularity appearing in the cross-sectional line corresponding to variations in light intensity in FIG. 3. The variations in light intensity with lapse of time as shown in FIG. 3 is caused by driving the light modulator 109 through an electrical circuit (not shown).

The foregoing description explains, in respect of a very simple case of variations in light intensity with lapse of time, the fact that, by causing the laser beam to pass through appropriate light modulator and light converging optical system, it is possible to form undulating irregular surfaces at the bottom of the spiral guide groove in U-shaped or gutter-shaped cross-section as shown in FIG. 4 to impart vibrations to the reproduction stylus.

The thus recorded signal is formed into a record disc by almost same way as in the production of an ordinary record disc from a lacquer disc in the audio record technique, wherein silver mirror is first applied to the photoresist layer having the undulating irregular surface corresponding to the recorded signal formed at the bottom of the spiral groove or track, then nickel plating is applied to this lacquer disc to obtain a shaping mold, and the shape of the irregular surface in the groove formed on the photoresist layer is transferred onto the surface of a disc made of polyvinyl chloride, whereby a record disc is obtained. The resulted product is called "video record," or "video disc," the reproduction of which can be done, for example, by the following expedient.

Figure 6:
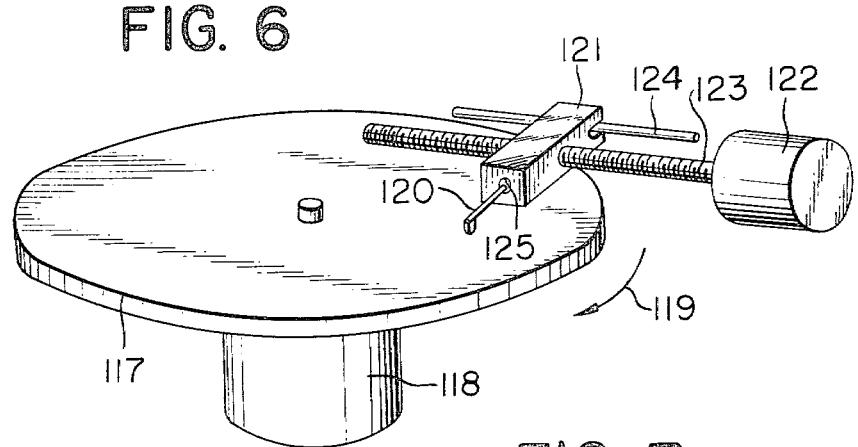
FIG. 6 is a perspective view of a device for reproducing an information on a recording medium.

In FIG. 6, a reference numeral 117 designates the video disc produced by the above-described manner, and 118 indicates a motor for rotating the video disc. The motor is driven in the arrow direction 119 at a predetermined speed by a power source (not shown). Incidentally, the video disc shown in the drawing figure is dispensed with the spiral signal track or groove formed thereon for simplification of the illustration. A pickup assembly 120 to pick up the recorded signal by tracing the spiral track formed on the disc surface is coupled to, and supported by, a holder 121 by way of an elastic body 125 such as rubber material.

The holder 121 is engaged with a screw-threaded rod 123 to cause the pickup 120 to move in the radial direction of the video disc 117, and also with a guide rod 124 to prevent the holder 121 from rotating around the screw-threaded rod 123. A motor 122 for advancing the holder 121 is rotated by a drive circuit (not shown) in association with rotation of the motor 118 in such a manner that the holder 121 may shift for a distance corresponding to 1 pitch of the spiral groove recorded with a signal in the radial direction of the disc per one rotation of the video disc 117.

Figure 7A:
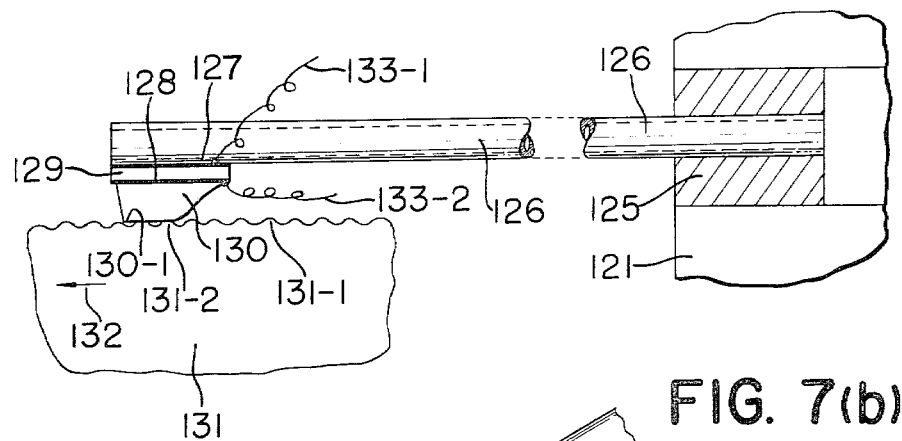

The details of the pickup assembly 120 is as shown in FIG. 7A. That is, one surface of a piezo electric element 129 having its long and short sides of a few hundred microns and a thickness of a few tens of microns, and having on both surfaces thereof electrodes 127 and 128 is adhesively fixed to one end part of a tube made of a light-weight material such as, for example, titanium, and the other surface of the element 129 is provided with a stylus 130 made of, for example, diamond. The other end part of the tube 126 is coupled with the holder 121 through the elastic body 125 such as rubber.

Figure 7B:
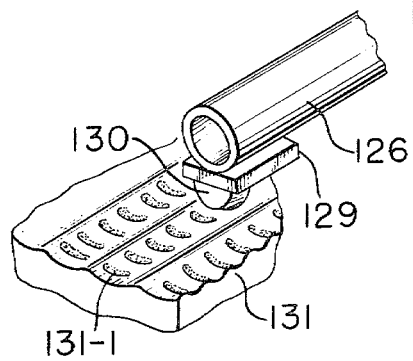

FIG. 7B shows a state of contact of the reproduction stylus 130 with the video disc 131, wherein a reference numeral 131-1 designates the wavy irregular surface of the recorded signal provided on the surface of the video disc 131. When it is assumed that the video disc 131 moves in the arrow direction 132 in FIG. 7A, peak portions 131-2 in the spiral track on the video disc 131, which have so far been pressed by the stylus 130, are abruptly released from the pressed condition with the result that there occurs sudden variation in pressure in the stylus 130. This change in pressure is conveyed to the piezo-electric element 129, from which it is taken out as an electrical signal through lead lines 131-1 and 133-2 taken from the electrodes of the element 129.

This signal detection system is considerably different from that in the conventional audio record disc. That is to say, in the ordinary audio record disc, the detect system is so adapted as to detecting movement of the stylus by a magnetic sensitive member provided in the vicinity of the root of a cantilever made of such material as titanium tube, at the tip end of which the stylus is fitted, the cantilever as a whole moving in accordance with wavy irregularities in the groove, or the system is adapted to detect the stylus movement in the form of electro-motive force from movement of a moving coil connected in the neighborhood of the stylus at the cantilever. In other words, in the conventional audio pickup, the stylus per se is made to truthfully follow the irregular surfaces in the spiral groove on the audio record disc.

In contrast to the above, in the signal detection for the video disc according to the present invention, the stylus holding system consisting of the cantilever tube 126, elastic body 125, and so on, as shown in FIG. 7A is not designed to move in pursuance of the shape of the wavy irregular surfaces 131-1 formed in the groove on the video disc, but is designed to constantly maintain the stylus 130 pressed to the bottom of the groove on the disc at as uniform a pressure as posible as so not to cause it to get off the groove, but to follow vertical movement of the disc surface derived from incompleteness in the manufacturing process of the video disc, or incompleteness in the disc holding means, or accompanied by rotation of the disc, or to follow oscillation of the spiral groove on the disc in the radial direction thereof.

Thus, in the video disc, as the frequency of the modulating signal to be recorded is as high as several megaHertz as mentioned above, it is hardly possible to cause the cantilever itself to vibrate at such high frequency. Therefore, if the disc per se is manufactured sufficiently flat, and, moreover, is supported sufficiently flat for rotation, the cantilever tube 126 will not move up and down, and, at the moment when the peak portions in the wavy irregular surfaces on the disc which have been pressed by the stylus 130 are separated from the tip 130-1 of the stylus 130, the peak portions are released from their pressed state. By repetition of this phenomenon, the repeated cycle of the wavy irregular surfaces in the groove will be taken out of the lead lines 133-1 and 133-2 as the principal information.

In case the detection means as shown in FIG. 7A is realized, the amplitude, with which the cantilever tube 126 can follow the vertical movement of the disc surface is such that it is remarkably decreased with increase in the frequency of the vertical movement of the disc surface. If there exists very fine undulation on the surface of the disc, with which the surface moves vertically in the frequency of several tens of kilo-Hertz with rotation of the disc, the amplitude, with which the cantilever tube 126 can follow this vertical movement is at best a few microns or so.

The foregoing has outlined the reproduction means for the video disc. In addition, when the wavy irregular surface in the groove corresponding to the recorded signal by the laser beam as described in the foregoing is to be reproduced, the following problem actually occurs.

In the foregoing explanations with respect to FIGS. 3, 4, and 5, considerations have been dispensed with as to the influence which the distribution in the Q-Q' direction of the linearly distributed light in FIG. 5 renders on the formation of the cross-sectional shape of the undulating irregular surfaces at the bottom of the groove in the travelling direction of the stylus. The influence take place in the following manner.

Figure 8:
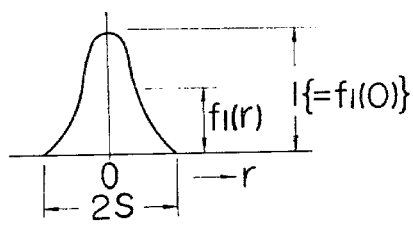
FIG. 8 is an explanatory diagram showing distribution of the beam energy.

The state of distribution of the linearly distributed light shown in FIG. 5 is determined by the distribution of light incident on the light converging optical system, numerical aperture of the light converging optical system, focal length of the cylindrical lens, and aberration of the light converging optical system, and so on. However, on observing the distribution in the Q-Q' direction, it will assume in most cases a shape as shown in FIG. 8. While the light intensity per se is determined by its intensity incident on the optical system, its distribution is independent of the intensity, hence it can be represented by being normalized. Accordingly, distribution of light can be shown sufficiently with the intensity at a position distant from the center of the co-ordinate by r, when the light intensity at the center is set to be 1 unit, although in the explanation hereinafter, consideration is given only on the Q-Q' cross-section in FIG. 5.

In the example of FIG. 8, the light distribution is in a form similar to that of an error function and is symmetrical with r=0. This will be represented by a function which is $f_{1(r)}$.

Figure 9A:
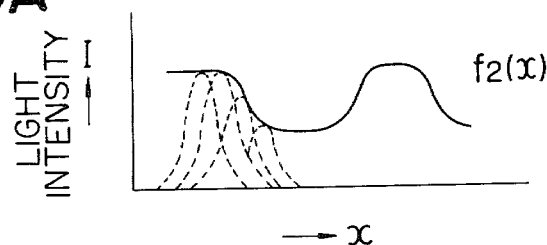

Now assume that a light beam having a distribution of $f_{1(r)}$ moves in the horizontal direction (as viewed from the top surface of the drawing figure) at an equal speed from one end to another as shown in FIG. 9A with a relationship between the intensity I at the center of the moving light beam and the position x thereof being represented by $f_{2(x)}$. The exposure quantity which a certain position x receives can be represented by the following equation.

$$\int_{-\infty}^{\infty} f_{2}(x + r) \cdot f_{1(r)} dr = f_3(x) \quad (1)$$

Figure 9B:
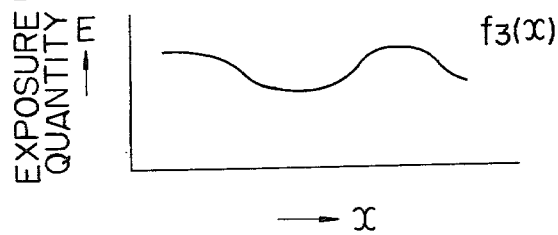

FIG. 9B denotes this situation.

Figure 10:
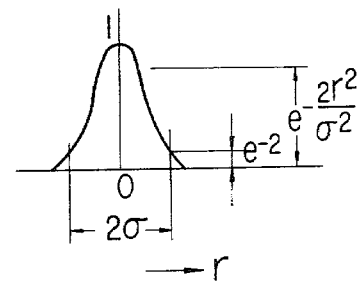
FIGS. 9A, 9B, and 10 are respectively for the explanations of light intensity, exposure quantity, and energy distribution.
Figure 11A:
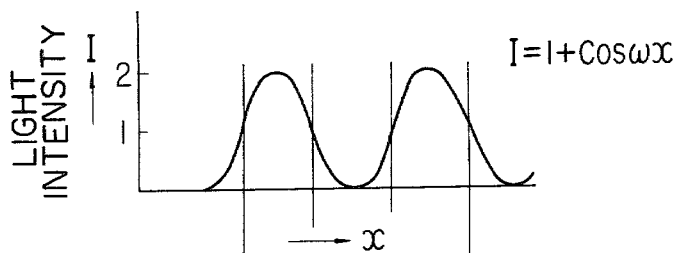
FIGS. 11A and 11B are respectively for the explanations of light intensity and exposure quantity.

In case the positional variations in the light intensity are in the relationship of the trigonometrical function, the exposure quantity at each position by the linearly distributed light which has passed therethrough can be easily found as follows. That is to say, when the light of the intensity distribution as shown in FIG. 10 is caused to move at an equal speed from a position $x = -\infty$ to a position $x = \infty$, while the light intensity at the center thereof is being subjected to variations corresponding to the positions as shown in FIG. 11A, the exposure quantity at each position of x becomes a function of x as well as a function of a value $\omega$ which indicates a cycle of changes in the light intensity with respect to x. This can be represented as follows.

$$E(x, \omega) = \int_{-\infty}^{\infty} [1 + \cos \omega (x + r)] \cdot e^{-\frac{2r^2}{a^2}} dr \quad (2)$$

The result of the integration in the equation (2) will become as follows.

$$E(x, \omega) = \sqrt{\frac{\pi}{2}} \ a(1 + e^{-\frac{a^2\omega^2}{8}} \cos \omega x) \quad (3)$$

Figure 11B:
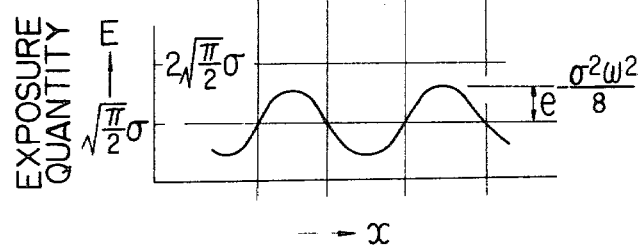

As will be understood from FIG. 11B and the above equation (3), when the value of $\omega$ becomes large, variations in the exposure quantity become small. This means that, when the wavy irregular surfaces corresponding signals to be recorded are to be formed on the photoresist layer, for example, if the recording wavelength becomes short, the amplitude of the irregularity to be recorded thereon also reduces.

Figure 12A:
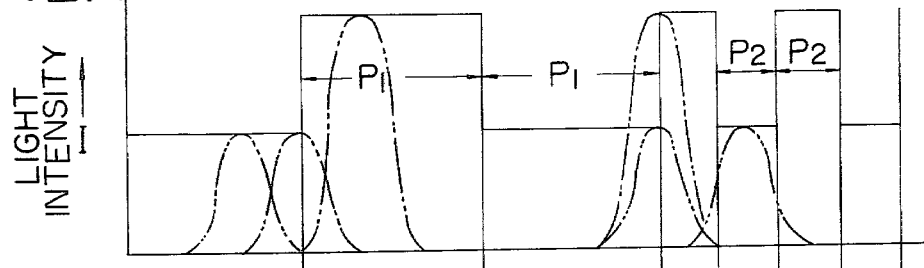
FIGS. 12A and 12B are respectively for the explanations of light intensity and exposure quantity of the recording medium.
Figure 12B:
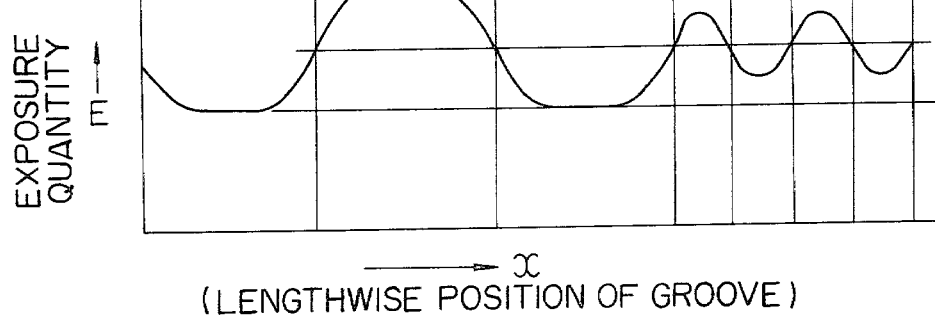

FIG. 12 shows an example which takes place actually at the time of recording a video signal. That is, when the intensity modulation is conducted on the light beam as shown in FIG. 12A with respect to the position x in the groove of the disc, i.e., when the center of the linearly distributed light comes to each position of x, if the intensity distributed light moves at an equal speed in the lateral direction as viewed from the top surface of the drawing, while the intensity of the light therearound is taking a value as shown by the dot-and-dash line, the exposure quantity at every position of x, i.e., the integrated value of the light beam which the every position has received is as shown in FIG. 12B. That is, at the portion where the cycle of variations in the light intensity is larger than the width 28 of the light shown in FIG. 8, i.e., at the portion $P_1$ in FIG. 12, there can be seen a saturation in the exposure quantity depending on the position of x. However, at the portion where the cycle is smaller than the width 2S, i.e., at the portion $P_2$, the difference between the maximum and minimum values in the exposure quantity is reduced. Further, in comparison with the minimum value in the portion $P_1$, the minimum value in the portion $P_2$ is larger. Also, the maximum value in the portion $P_2$ is smaller than the maximum value in the portion $P_1$.

Figure 13:
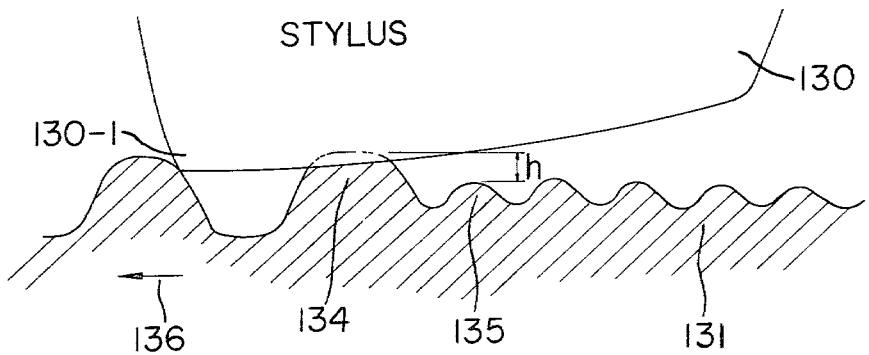
FIGS. 13 and 14, respectively, show the loci of the signal to be formed on the recording medium.

If such exposure is carried out to the photoresist layer at its portions where the relationship between the elution quantity of the photoresist layer and exposure quantity thereto is rectilinear, i.e., at the region where the photoresist layer dissolves out in proportion to the exposure quantity thereto, the shape of the wavy irregular surfaces formed on the disc becomes as shown in FIG. 13, wherein the peak 135 of the short wavelength portion becomes lower in height than the peak 134 of the long wavelength portion.

Accordingly, if the disc moves in the arrow direction 136, for the contact position of the stylus 130 to shift from the peak 134 to the peak 135, the stylus 130 should be displaced downward for a height h in FIG. 13 in a shorter time than that, during which the disc 131 moves between the distance of the peak 134 and the peak 135. Such rapid displacement cannot be realized owing to various restrictions such as mass of the stylus 130 and cantilever tube, as the result of which the stylus 130 slides over the disc surface without contacting the peak 135. At which position the stylus 130 again contacts the disc 131 is determined by the performance of the stylus 130 to follow the vertical movement of the disc. Needless to say, when the stylus 130 slides over the disc as such, it is not possible to detect truthfully modulating signal from the irregular surface on the disc with the result that the so-called "drop-out" phenomenon arises.

Figure 14:
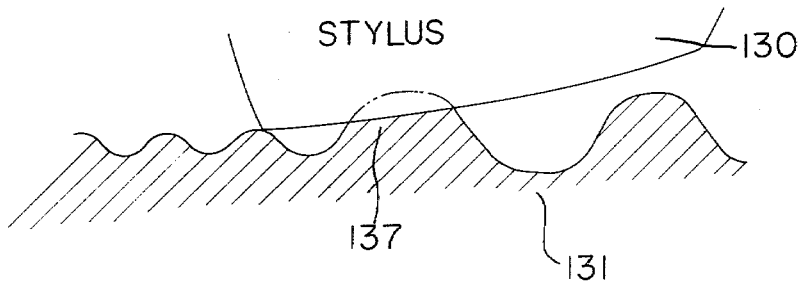

FIG. 14 shows a case where the long wavelength portion follows the short wavelength portion, as opposed to the case of FIG. 13. In such case, there will be imparted considerably large pressure to the peak portion 137 to cause permanent deformation on this peak, or remarkable wear and tear with the stylus.

(2) Specific Discussion of Present Invention

The present invention intends to solve such disadvantage as mentioned above to arise at the time of recording a video signal by the use of light, which can be attained by rendering the height of the peak portions in the irregular surfaces formed on the video disc to be substantially same. In more detail, such defect as mentioned above is removed by modulating light to be recorded with a modulating signal composed of a corrective signal associated with the frequency of the image signal to be recorded superposed on this image signal.

Figure 15A:
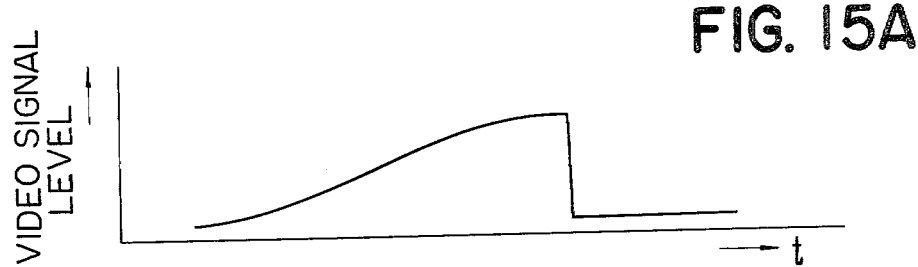
FIGS. 15A, 15B, 15C, and 15D are respectively graphical representations showing signal waveforms and depth of elution of the photoresist layer.
Figure 15B:
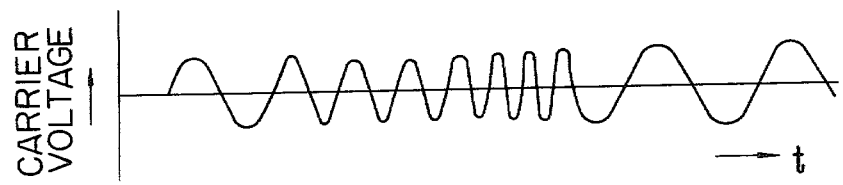
Figure 15C:
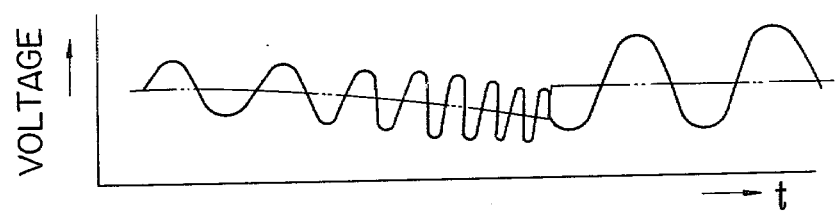

Explaining more detailed construction and function of the present invention with reference to the accompanying drawing, FIG. 15A indicates a part of the video signal, and FIG. 15B indicates a voltage waveform of a carrier which has been frequency-modulated by the video signal. FIG. 15C is also a voltage waveform which has been resulted from addition to the abovementioned carrier voltage waveform a certain definite direct current voltage and another voltage which is in a functional relationship (to be described in detail hereinafter) corresponding to the level of the video signal. Incidentally, the foregoing explanations as to FIGS. 1 through FIG. 14 inclusive are with respect to a case, wherein the light beam is modulated by a modulating signal composed of the voltage shown in FIG. 15B and a definite direct current voltage superposed thereon. When this voltage is impressed on the light modulator shown in FIG. 1, the light intensity at the center of the linearly distributed light obtained at the photoresist surface assumes a value proportional to the voltage waveform shown in FIG. 15C. When this light is exposed on the photoresist layer by rotating the disc 101 at a predetermined definite speed, the shape of the wavy irregular surfaces on the disc to be obtained after the development will become as shown in FIG. 15D.

Figure 15D:
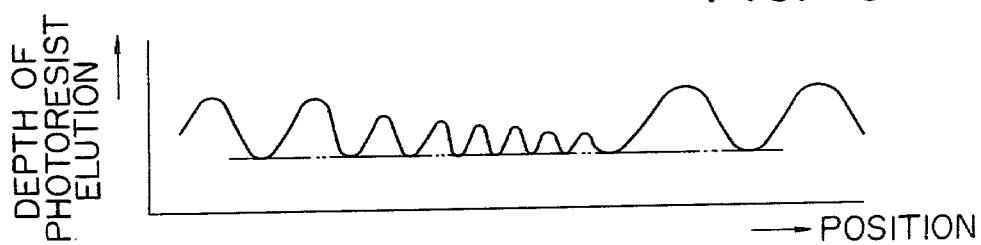

In FIG. 15D, the bottoms or valleys of the waveforms on the photoresist surface are on the same line or height. In other words, when the video disc which has been manufactured by transferring the waveforms on the photoresist surface thus obtained is to be reproduced, the contacting state between the stylus and the disc surface is not as shown in FIGS. 13 and 14, but, as the height of the peak portion in the irregularities on the disc surface is contact irrespective of the frequency thereof, smooth detection of the carrier signal is possible.

FIG. 16 is one example of a block diagram of a circuit to treat an electrical signal as mentioned above. An electrical signal from a video signal source 138 such as, for example, video tape recorder, etc., is added to a frequency modulator 139, from which a voltage having a frequency which varies in a linear relationship with the level of the video signal is generated.

The video signal source 138 and frequency modulator 139 constitute a video signal generating means.

FIG. 17A indicates a video signal from the abovementioned video signal source 138, and FIG. 17B indicates a carrier waveform obtained from the abovementioned frequency modulator 139 and corresponding to the abovementioned video signal. A direct current bias source 140 in FIG. 16 feeds a direct current voltage of a definite level to be impressed on the light modulator so as to obtain a bias light to form the stylus guide groove in a gutter-shape (U-shape), i.e., the light corresponding to the light b in FIG. 3. An addition circuit 142 adds to the light modulator 143 a voltage from the direct current bias source and that from the frequency modulator 139. A composite voltage resulted from such addition becomes as shown in FIG. 17C, whereby the carrier voltage waveform shown in FIG. 17B is raised for the portion corresponding to the direct current bias E1. The voltage from the video signal source is applied to a processor 141.

Before explaining the processor per se, more detailed observations will be given in the following on the recorded waveform in the absence of the processor. When the recording frequency becomes higher, the amplitude of the exposure quantity onto the recording surface becomes reduced as shown by the equation (3). The value of the exposure amplitude with respect to a certain $\omega$ for the cycle change in the light intensity to x may be represented as $Ke^{-k\omega^2}$, where K and k are constants. Now, if a modulator, wherein a voltage and a transmission factor are in proportional relationship is driven by a voltage which varies at a certain definite amplitude as shown in FIG. 17C, the amplitude $A\omega_1$ of the exposure quantity with respect to $\omega_1$ may be represented as follows.

$$A\omega_1 = Ke^{-k\omega_1^2} \quad (4)$$

where K is a constant.

Similarly, when the frequency is $\omega m$, the amplitude is represented as follows.

$$A\omega m = Ke^{-k\omega m^2} \quad (5)$$

The difference between the above two equations (4) and (5) are as follows.

$$A\omega_1 - A\omega m = K(e^{-k\omega_1^2} - e^{-k\omega m^2}) \quad (6)$$

Now, assume that the carrier frequency to the video signal voltages $V_1$, $V_2$, and $V_m$ are respectively $\omega_1$, $\omega_2$, and $\omega_3$, the following equation may be established.

$$\omega_m = \omega_1 + \frac{\omega_2 - \omega_1}{V_2 - V_1}(V_m - V_1) \quad (7)$$

Therefore, difference in the peaks of the irregular waveforms on the disc surface ($A\omega_1 - A\omega m$), i.e., the value of $\beta$ in FIG. 17D can be obtained from the above equations (6) and (7), as follows.

$$\beta = A\omega_1 - A\omega m$$
$$= [e^{-k\omega_1^2} - e^{-k\{\omega_1 + \frac{\omega_2 - \omega_1}{V_2 - V_1}(V_m - V_1)\}^2}]$$
$$= F(Vm)$$

Accordingly, in order to reduce the value of $\beta$ as far as possible, the light modulator may be driven with a voltage composed of the voltage shown in FIG. 17C added with $-aF_1(Vm)$, where the constant a is an applied voltage to the light modulator to obtain elution of the photoresist layer at a unit depth. The processor 141 is a circuit for obtaining this value of $aF_1(Vm)$, and the output from this processor 141 corresponds to a voltage, the polarity of which has been reversed to that shown in FIG. 17E.

Figure 20:
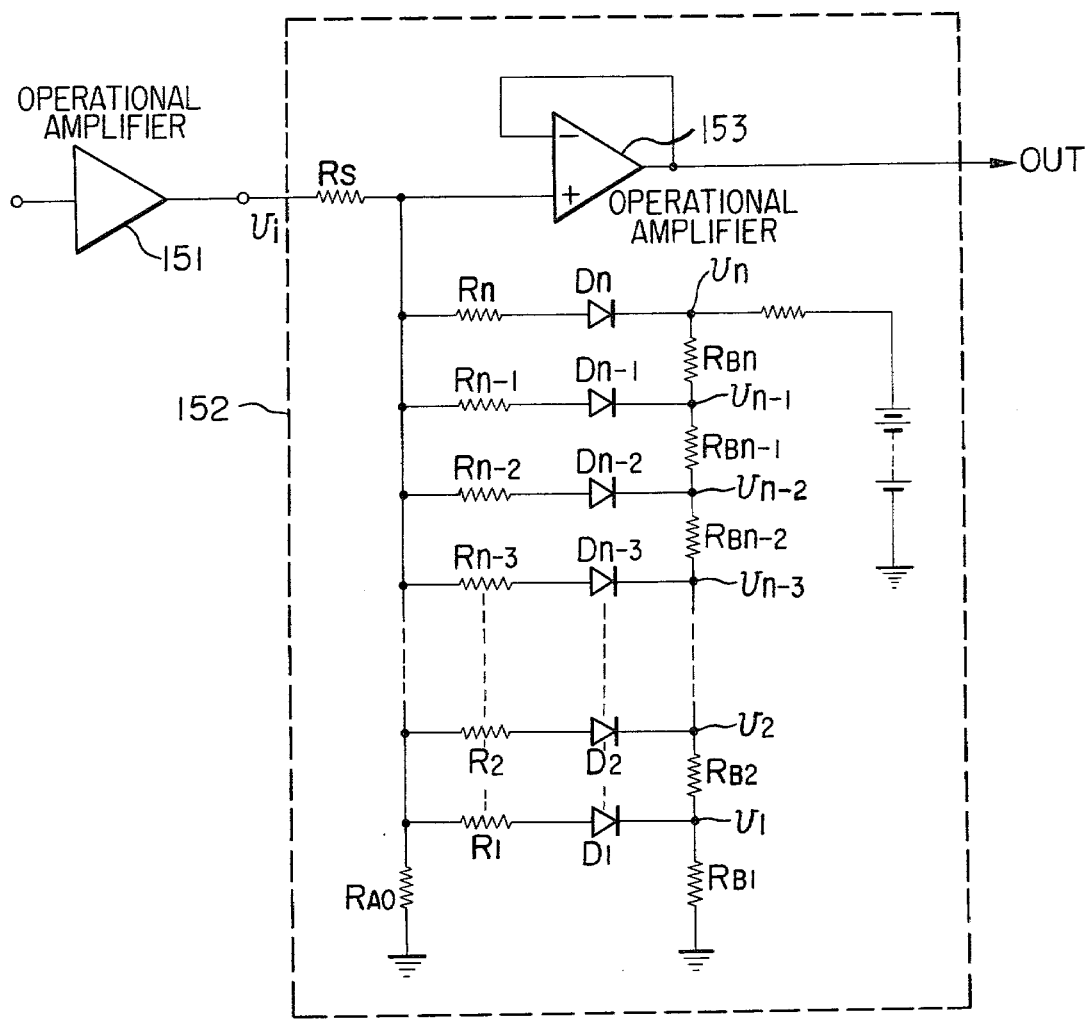
FIGS. 20 and 21 are respectively circuit constructions of the processor.

Such processor 141 can be realized by an amplifier 151 and a polygonal line approximation circuit 152 as shown in FIG. 20. This polygonal line approximation circuit, as has been well known, is the circuit for approximating a function with several rectilinear lines, when an amplifier having input and output characteristics other than the primary function is required. When a voltage $V_i$ [$R_{A0}/(R_{A0}+Rs)$] to be determined by an input voltage $V_i$, and resistances Rs and $R_{A0}$ are below $V_1$, the attenuation is by Rs and $R_{A0}$ alone. However, when the voltage becomes greater than $V_i$, $D_1$ become "on" to cause both $R_1$ ($R_{B1} < R_1$) to be in parallel with $R_{A0}$ with the consequent increase in the attenuation. When the voltage further exceeds $V_2$, $R_2$ becomes in parallel with $R_{A0}$, and the attenuation further augments, and so on, whereby the inclination of the rectilinear line can be varied on the march of the values $V_1, V_2 \ldots V_n$. Consequently, a characteristic curve approximate to any arbitrary curve can be obtained. Incidentally, a reference numeral 153 designates an operational amplifier.

Accordingly, the processor as shown in FIG. 20 can be realized by setting the amplifying factor of the amplifier 151 to be $ae^{-k\omega_1^2}$ (the only variable, at the point of determining the recording system, is Vm, and the remaining are constants), and by giving the polygonal line approximation circuit 152 a characteristic representable by $$1 - e^{-\kappa t}\{\omega_1 + \frac{\omega_2 - \omega_1}{V_2 - V_1}(Vm - V_2)\}^2 - \omega_1^2].$$

As stated above, by causing the voltage in FIG. 17C to vary by the voltage from the processor 141 in the relationship of $aF_1(Vm)$ with respect to the video signal voltage, it becomes possible to correct variations in height of the peaks in the wavy irregularities on the disc surface which will take place when the light modulator is driven by a definite bias voltage and a definite amplitude voltage. This corrected waveform is shown in FIG. 17F.

In the foregoing, $F_1(Vm)$ has been used for obtaining a voltage to be impressed on the addition circuit 142 for correction of the abovementioned height difference. It is, of course, possible to obtain the corrective voltage from the frequency of the carrier as modulated. In this latter case, the height difference $\beta$ can be immediately derived from the equation (6), as follows.

$$\beta = K(e^{-\kappa \omega_1^2} - e^{-\omega m^2}) = F_2(\omega m) \qquad (9)$$

A circuit construction in this case is shown in FIG. 18. In FIG. 18, a reference numeral 144 designates a video signal source, 145 refers to a frequency modulator, 146 indicates a direct current bias source, each of which functions same as 138, 139, and 140 in FIG. 16. One of the outputs from the frequency modulator 145 is input into the processor 148, from which $aF_2(\omega m)$ is obtained. The video signal source 144 and frequency modulator 146 constitue a video signal generating means.

Figure 21:
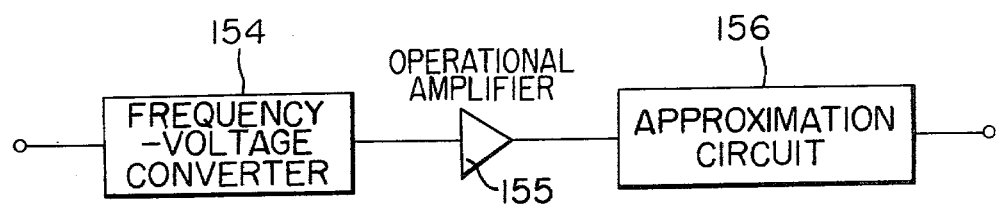

Such processor 148 can be realized by an amplifier 155 similar to the amplifier 151 shown in FIG. 20, and a polygonal line approximation circuit 156 similar to the circuit 152 shown in FIG. 20, after the frequency signal is converted into the voltage signal by means of the frequency-voltage converter 154 as shown in FIG. 21 which obtains voltage $V_1$ from a frequency $\omega_1$, voltage $V_2$ from a frequency $\omega_2$, and voltage Vm from a frequency $\omega$m.

Reference numeral 147 in FIG. 18 designates a delay line for imparting to the carrier signal a delay time which the processor requires for its process, when a corrective voltage is to be obtained by the processor. The reason for giving the time delay to the carrier signal is that, in this case, there inevitably occurs time delay in converting a signal which has been frequency-modulated, and, in the absence of the delay line, such time delay is unavoidable with respect to the frequency-modulating signal to be recorded by the corrective voltage.

Figure 19:
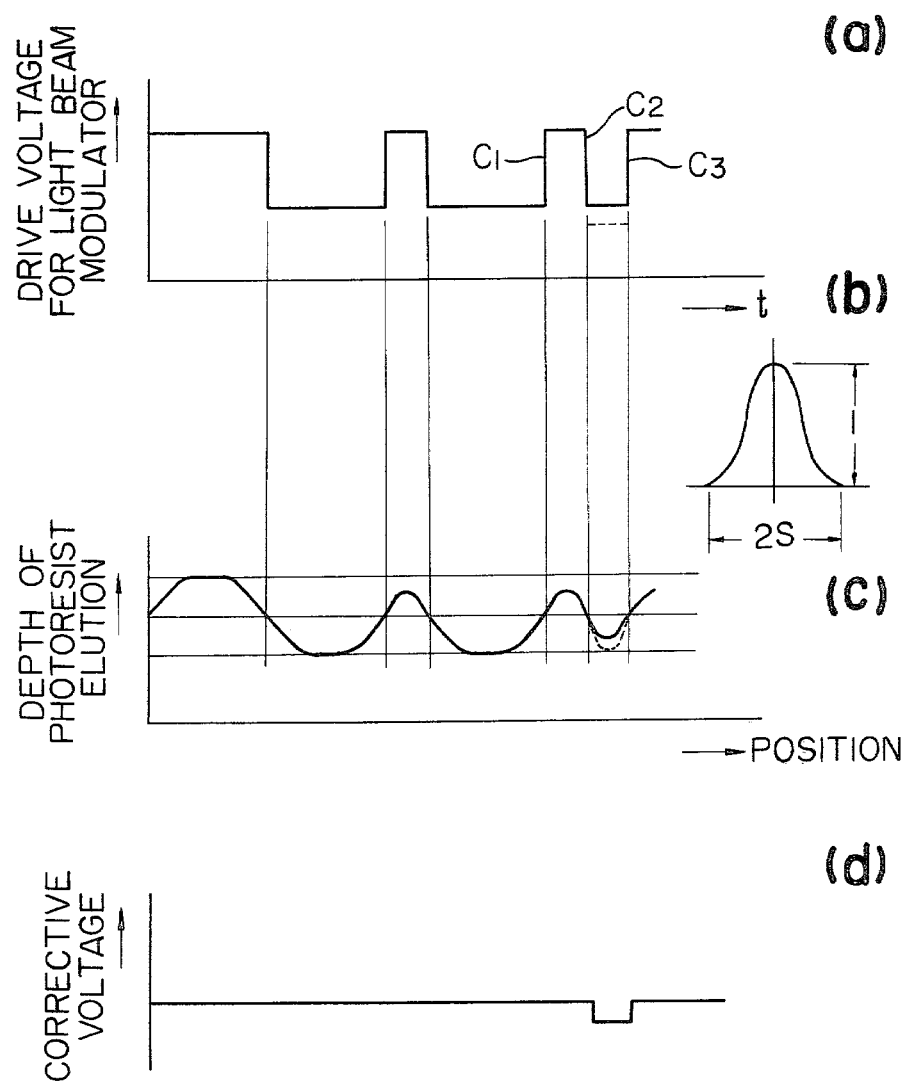
FIGS. 19A, 19B, 19C, and 19D are for explanation of the recording method according to the present invention.

More detailed reasons for requiring such delay line will be explained hereinbelow with reference to an example. Assume that a carrier which has been modulated by the frequency modulator 145 is shaped in the modulator interior, to which a direct current voltage has been added to form an output voltage as shown in FIG. 19A in solid line. Such waveform is generally called pulse frequency modulation, and, for the sake of simplicity in explanation, such waveform is utilized.

If this voltage is added to the modulator, and the photoresist surface is exposed with a light of the distribution as shown in FIG. 19B which is moving at an equal speed, the quantity of elution of the photoresist layer thereby is as shown by a solid line in FIG. 19C.

As stated above, a desirable shape of the wavy irregularities on the photoresist surface is as shown by a dotted line in FIG. 19C, for obtaining which a voltage as shown by the dotted line in FIG. 19A is required. This voltage corresponds to a sum of the voltage in solid line in FIG. 19A and the voltage in FIG. 19D, and, when there exist voltage variations such as $C_2$ and $C_3$ in FIG. 19A, i.e., there exist voltage variations, in which projections of narrow width are to be caused on the photoresist layer, a corrective voltage as shown in FIG. 19D must be generated. However, whether or not such corrective voltage as shown in FIG. 19D is required is not yet determinative at the point of the voltage variation, but it is only made known that such corrective voltage should have been generated from the point of $C_2$, when the point $C_3$ of the voltage variation has been reached.

Generation of this corrective voltage is the function which the processor 148 should undertake. That is, the processor is required to predict the variations in the carrier, in advance of which it should generate the corrective voltage, although such is an impossible task. In reality, however, by provision of the delay line 147, the time, in which variation in the carrier at its certain first point reaches the addition circuit, is delayed in comparison with the time, in which such variation enters into the processor, whereby a corrective voltage made known by a second variation which will take place in continuity to the abovementioned variation can be supplied to the addition circuit simultaneously with the first variation. In this manner, the elution quantity of the photoresist layer as shown in FIG. 19C in dotted line can be obtained.

Explanations have been made hereinbefore about the case where the transmission factor of the light modulator is proportionate to the applied voltage as in the supersonic optical modulating element. However, in the case of the so-called electro-optical modulating element, the relationship between the applied voltage and the transmission factor is complicated. Accordingly, the value of the corrective voltage should, of course, be that which has taken into consideration the characteristics of this modulating element.

As stated in the foregoing, the present invention has been constructed in such a way that the lowering in the peaks of the wavy irregularities in the short wavelength portion, which arises when the distribution of the light quantity formed on the recording material by a light converging optical system becomes gentle, is so corrected that such peaks may become flat throughout the entire recording frequency by applying to the light modulation a corrective voltage to be obtained as a function of the video signal level, or, as a function of the carrier frequency. With such unique construction, the invention is very effective in carrying out the optical recording of the irregularities of the short wavelength formed on the disc surface so as to be stably detected.

What is claimed is:

1. An optical high density recording device comprising:
    (a) laser beam modulating means for forming a laser beam modulated in accordance with a modulating signal applied thereto;
    (b) a recording medium onto which the modulated laser beam obtained from said laser beam modulating means is irradiated, wherein the beam-irradiated portions of said medium are recorded in the form of undulations in accordance with the irradiated beam;

(c) means for moving said recording medium and the beam irradiated onto said recording medium relative to one another;

(d) a video signal generating means for generating a frequency-modulated video signal;

(e) processing means connected to said video signal generating means for generating a corrective signal having a corrective voltage corresponding to the frequency of said frequency-modulated video signal to make the height of said undulations constant when the frequency of said frequency-modulated video signal exceeds a particular frequency; and (f) adding means for adding an output from said video signal generating means and an output from said processing means to form a modulating signal for application to said modulating means.

2. The device as claimed in claim 1, further comprising delay means for delaying the application of the frequency-modulated video signal generated by said video signal generating means to said adding means.

3. The device as claimed in claim 1, wherein said video signal generating means includes a video tape recorder.

4. The device as claimed in claim 1, further comprising d.c. signal generating means for adding a d.c. bias signal to said adding means to form a guide groove on said recording medium.

5. The device as claimed in claim 4, further comprising delay means for delaying the application of the frequency-modulated video signal generated by said video signal generating means to said adding means.

6. An optical high density recording device comprising:

(a) laser beam modulating means for forming a laser beam modulated in accordance with a modulating signal applied thereto;

(b) a recording medium onto which the modulated laser beam obtained from said laser beam modulating means is irradiated, wherein the beam-irradiated portions of said medium are recorded in the form of undulations in accordance with said irradiated beam;

(c) means for shifting said recording medium and the beam irradiated onto said recording medium relative to one another;

(d) a video signal source for generating a video signal;

(e) frequency modulating means for modulating the frequency of the video signal output from said video signal source;

(f) delay means for delaying the frequency modulated video signal output from said frequency-modulating means;

(g) processing means connected to said frequency-modulating means for generating a corrective signal having a corrective voltage corresponding to the frequency of said frequency-modulated video signal to make the height of said undulations constant when the frequency of said frequency-modulated video signal exceeds a particular frequency; and (h) adding means for adding an output from said delay means and an output from said processing means to form a modulating signal for application to said modulating means.

7. The device as claimed in claim 6, further comprising a d.c. signal generating means for adding a d.c. bias signal component to said adding means to form a guide groove on said recording medium.

* * * * *